H. D. STONE.
MANUFACTURE OF COMMUTATORS FOR ELECTRIC MOTORS.
APPLICATION FILED DEC. 1, 1919.
1,407,776.
Patented Feb. 28, 1922.
2 SHEETS—SHEET 1.
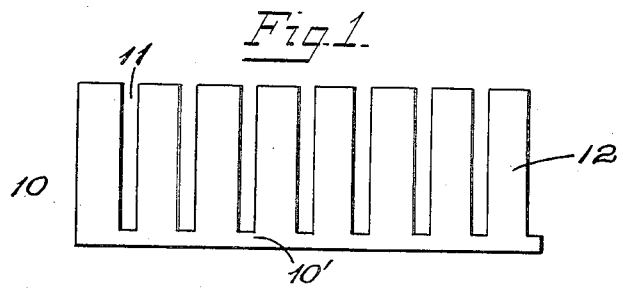
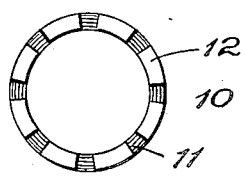
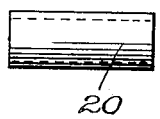
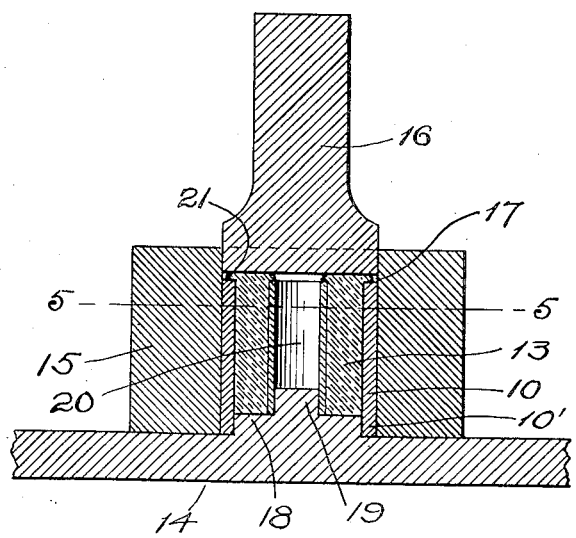
Inventor
Harris D. Stone
By Henry E. Rockwell
Attorney H. D. STONE.
MANUFACTURE OF COMMUTATORS FOR ELECTRIC MOTORS.
APPLICATION FILED DEC. 1, 1919.
1,407,776. Patented Feb. 28, 1922.
2 SHEETS—SHEET 2.
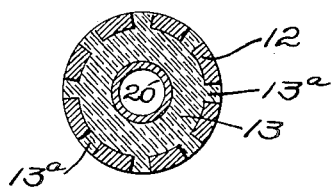
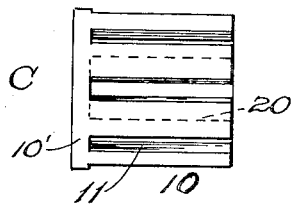
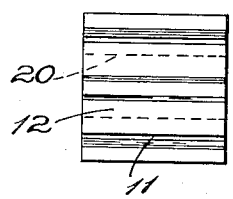
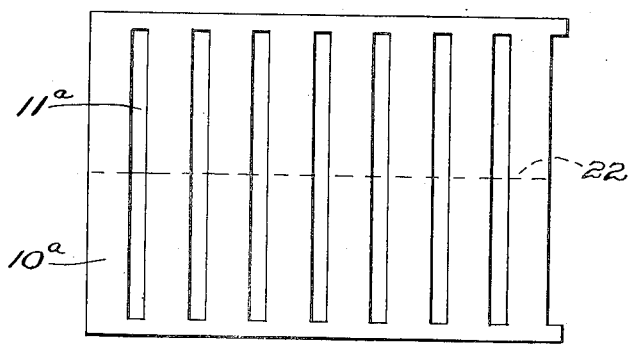
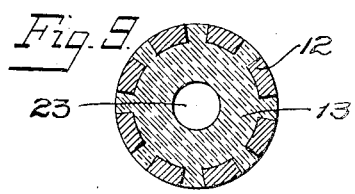
Inventor
Harris D. Stone
By Henry E. Rockwell
Attorney

UNITED STATES PATENT OFFICE.

HARRIS D. STONE, OF NEW HAVEN, CONNECTICUT, ASSIGNOR TO THE A. C. GILBERT COMPANY, OF NEW HAVEN, CONNECTICUT, A CORPORATION OF CONNECTICUT.

MANUFACTURE OF COMMUTATOR FOR ELECTRIC MOTORS.

1,407,776. Specification of Letters Patent. Patented Feb. 28, 1922.

Application filed December 1, 1919. Serial No. 341,778.

*To all whom it may concern:*

Be it known that I, HARRIS D. STONE, a citizen of the United States, residing in the city and county of New Haven and State of Connecticut, have invented certain new and useful Improvements in the Manufacture of Commutators for Electric Motors, of which the following is a full, clear, and exact description.

This invention relates to commutators, and more particularly to a novel and cheap method of manufacturing commutators for electric motors and the like.

Heretofore commutators have been manufactured to some extent by arranging the metal commutator sections within a mold in spaced relation to each other and then forming a body of plastic material within the mold with the commutator sections embedded therein. This method of constructing commutators is open to the objection that considerable difficulty has been experienced in properly positioning the separate sections within the mold and in retaining these sections in place until the plastic material has become set about the same.

The primary object of the present invention, therefore, is to provide a very simple and inexpensive method of manufacturing commutators which is free from the objections above pointed out.

To this and other ends, the invention consists in the novel features and steps to be hereinafter described and claimed.

In the accompanying drawings:

Fig. 1 is a plan view of a plate or strip of sheet metal having a number of notches cut therein to form the spaced commutator sections.

Fig. 2 is an end view of the strip of sheet metal shown in Fig. 1 after the same has been coiled into a cylinder.

Fig. 3 is a side view of a short piece of tubing.

Fig. 4 is a longitudinal sectional view through one form of machine which may be used in the construction of my commutator, the partially completed commutator being shown therein.

Fig. 5 is a sectional view through the commutator taken on the line 5—5 of Fig. 4.

Fig. 6 is a side view of the commutator after the same has been removed from the machine shown in Fig. 4.

Fig. 7 is a view similar to Fig. 6, but showing the unslotted end of the commutator cut away.

Fig. 8 is a plan view somewhat similar to Fig. 1, showing one way in which the slotted strip of Fig. 1 may be formed; and Fig. 9 is a sectional view similar to Fig. 5, but showing a modification of my invention.

In the embodiment of my invention disclosed in the drawings, I have designated by the numeral 10 a strip or plate of sheet metal having a number of spaced slots 11 formed transversely across the same and extending from one marginal edge of the strip to a position adjacent the opposite marginal edge of the same. These slots 11 are provided to produce the spaced commutator sections 12 which are attached to each other by the unslotted portion 10' of the strip 10, and in order to position these sections 12 so that they will lie upon the periphery of a cylinder, the sheet metal strip 10 is bent or rolled into the form of a cylinder, as shown in Fig. 2. Any preferred means may be used to coil the flat strip shown in Fig. 1 into the cylinder shown in Fig. 2, such as a 3-roll coiler, a forming up and pressing machine or any other desired mechanism. When the strip 10 has been bent to form a cylinder, as in Fig. 2, the separate sections 12 will assume the position which they are to occupy in the completed commutator, so that the next step in constructing my commutator is to form a body member 13 within the cylinder 10. This may be conveniently done by the machine disclosed in Fig. 4. The body 13 of my commutator is preferably formed of any suitable plastic material which may be molded in the desired shape with the sections 12 firmly held in place upon the periphery of this body member and insulated from each other. For this purpose any one of several well-known resinous materials which are normally plastic, but will harden under the application of pressure and heat, may be used. In order to form the body of plastic material 13 within and about the sections 12, I have provided the mold shown in Fig. 4, consisting of a base member 14, a ring or body portion 15 resting upon the base member, and a power operated plunger 16, the lower end of which is constructed to conform closely to the cylindrical bore 17 formed within the body portion 15. The bore 17 is constructed to snugly receive therein the cylinder shown in Fig. 2 and upon the base plate 14 is formed the annular boss 18, the diameter of which is substantially the same as the interior diameter of the cylinder 10. This boss 18 preferably extends upward into the cylinder 10 far enough to lie flush with the bottom of the slots 11; that is the height of the boss 18 should be substantially the same as the height of the unslotted part 10' of the cylinder 10. Upon the boss 18 is formed concentric therewith a second and smaller boss 19, which is designed to snugly fit in one end of the cylinder tube 20 shown in Fig. 3, the arrangement being such that when the tube 20 is positioned over the boss 19, it will be retained centrally within the cylinder 10 with its upper edge lying substantially flush with the upper edge of this cylinder, as clearly shown in Fig. 4. After the cylinder 10 and tube 20 have been positioned within the mold in the manner just pointed out, the parts are then ready to receive the plastic material of which the body 13 is to be constructed. After this material has been placed within the mold, it may be forced to accurately assume the configuration of the same by lowering the plunger 16 into the mold and apply sufficient force upon the same to squeeze or compress the material therein, as shown in Fig. 4. While the plastic material is being compressed in the manner just pointed out, it is caused to set or harden within the mold by the application of heat, so that the hardened cylindrical body 13 is produced with the sections 12 embedded in its periphery, as clearly shown in Fig. 5. After the body of plastic material 13 has become hardened, the commutator thus formed may be removed from the mold, and the sections 12 will be firmly retained in place upon the periphery of the body 13 by the wedge-shaped portions 13ᵃ of the hardened material. Upon removing the commutator C (Fig. 6) from the mold, the unslotted portion of the tube 10 is cut away so that the commutator will then have the appearance shown in Fig. 7. Since the boss 18 is shown in Fig. 4 projects upward into the cylinder 10 to the extent above stated, the lower end of the body member 13 will lie flush with the lower ends of the slots 11, so that the body 13 will not extend into the unslotted portion 10' of the cylinder, hence when the unslotted portion 10' has been cut away upon a lathe or any other suitable machine, this end of the cylinder 10 will be flush with the end of the body 13. The upper end of the body portion 13 which may extend over the upper end of the cylinder and tube, as designated by 21 in Fig. 4, may be cut away flush with the upper end of the commutator in the same operation in which the lower end of the cylinder 10 is cut away.

From the above description when read in connection with the drawings, it will be seen that I have disclosed a very simple and satisfactory method for constructing a commutator and that an important feature of this method resides in the construction whereby the strip or plate 10 from which the sections 12 are formed serves to retain these sections properly positioned within the mold while the plastic material is being positioned within the mold about these sections.

In Fig. 8, I have shown a sheet metal plate or strip of sufficient width to permit two strips similar to that shown in Fig. 1 to be constructed at the same time, this being accomplished by forming the relatively long slots 11ᵃ within the relatively wide strip 10ᵃ, and then cutting the strip 10ᵃ along the dotted line 22.

Although in the preferred embodiment of my invention, I have shown the commutator as provided with a metal tube 20 positioned centrally therein, I do not regard this tube 20 as an essential feature of my invention, since if desired, the same may be omitted and the body 13 given a bore of the desired diameter, as indicated by 23 in Fig. 9. This bore 23 may very conveniently be constructed by simply extending the boss 19 shown in Fig. 4 upward throughout substantially the entire length of the body member 13.

I desire to have it understood that I do not regard my invention as limited to the precise procedure herein described, as various modifications may be adapted within the scope of the annexed claims.

What I claim is:

1. The method of making commutators which consists in slotting a flat strip of sheet metal to provide spaced sections, bending said slotted strip to form a cylinder, forming a body of insulating material within said cylinder with said spaced sections embedded therein, and cutting off the unslotted portion of said metal strip.

2. The method of making commutators which consists in providing a plurality of even sections and interconnecting means connecting said sections in spaced relation with the sections extending at right angles from said means, rolling the strip so formed into a cylinder, forming a body of insulating material within said cylinder with said sections imbedded therein, and removing said connecting means therefrom.

3. The method of making a commutator which consists in providing a flat body consisting of a plurality of spaced interconnected strips of conducting material, forming the same into substantially cylindrical shape, mounting the same upon a body of insulating material and then removing the connecting means.

4. The method of making commutators which consists in forming parallel slots across a strip of sheet metal from one lateral edge to points adjacent the other lateral edge, bending said slotted strip to form a hollow cylinder, filling the interior of said cylinder and said slots with insulating material, said insulating material having a shaft hole for said commutator formed therein during the filling of said cylinder, and cutting away the unslotted portion of said metal strip.

5. The method of positioning commutator sections within a mold and retaining the same in spaced relation preparatory to forming a commutator body of plastic material therein for said sections, which consists in slotting a flat strip of sheet metal to provide spaced but interconnected sections, bending said slotted strip to form a cylinder and placing the same within said mold.

6. The method of positioning commutator sections within a mold and retaining the same therein in their spaced relation during the forming of a body of plastic material about said sections, which consists in forming interconnected commutator sections, bending said sections so connected to form a cylinder and inserting the same in a mold with the connecting means embracing a boss raised from and integral with the bottom of said mold.

7. The method of making commutators, which consists of blanking out a flat sheet metal blank having slots extending across the same, whereby spaced sections are obtained connected at both ends, forming said sheet metal blank into a cylinder with the slots and spaced sections lying lengthwise of the cylinder, filling the cylinder and the slots of same with insulating material, cutting off the unslotted ends of the cylinder, and cutting the remaining cylinder portion into two equal parts.

8. The method of making commutators, which consists of stamping slots in a flat sheet metal strip, said slots extending from points adjacent one edge of said strip through the other edge, cutting up said slotted strip into portions of correct length to form, when bent, a cylinder of a desired diameter, bending each portion into a cylinder, placing insulating material in the cylinder, and cutting off the unslotted end of said cylinder.

9. The method of making commutators, which consists of stamping slots in a flat strip of sheet metal, said slots extending across the strip, whereby spaced sections are obtained connected at both ends, cutting up said slotted strip into portions of a correct length to form cylinders of a desired diameter, bending each portion into a cylinder, pressing insulating material into the cylinder, cutting the cylinder so filled into two parts, and cutting off the unslotted end of each part.

10. The method of making commutators which consists of producing spaced sections in a flat strip of sheet metal, said sections extending outward from points adjacent the center of said strip to the edges thereof, bending the strip of metal into a cylinder, filling the cylinder with insulating material and cutting the cylinder into portions across the center of same at the connection of said spaced sections.

11. The method of making commutators which consists in slotting a flat strip of sheet metal to provide spaced sections, bending said slotted strip to form a cylinder, placing same within a mold, placing a bearing member within said mold central with said cylinder, forming a body of insulating material within said cylinder, about said bearing member and imbedding said spaced sections, and cutting off the end of said commutator so formed to remove the unslotted portion of said metal strip.

12. The method of making a commutator which consists in providing a flat body consisting of a plurality of spaced interconnected strips of conducting material, mounting the same upon a body of insulating material of substantially cylindrical shape and then removing the connecting means.

In witness whereof, I have hereunto set my hand on the 26 day of November, 1919.

HARRIS D. STONE.